(12) United States Patent
Pelc et al.

(10) Patent No.: US 8,116,044 B2
(45) Date of Patent: Feb. 14, 2012

(54) SUPERCAPACITOR LEAK DETECTION AND MANAGEMENT

(75) Inventors: Thomas J. Pelc, Newark, CA (US); Jorge E. Martinez-Vargas, Jr., San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 235 days.

(21) Appl. No.: 12/636,910

(22) Filed: Dec. 14, 2009

(65) Prior Publication Data
US 2011/0141630 A1    Jun. 16, 2011

(51) Int. Cl.
*H02H 7/16* (2006.01)
*H01G 2/12* (2006.01)

(52) U.S. Cl. ........................................... 361/15
(58) Field of Classification Search ............... 361/15
See application file for complete search history.

(56) References Cited

U.S. PATENT DOCUMENTS

| | | | |
|---|---|---|---|
| 5,161,094 A * | 11/1992 | Bruder et al. | 361/502 |
| 7,701,697 B2 * | 4/2010 | Huang | 361/502 |
| 7,983,021 B2 * | 7/2011 | Reddy et al. | 361/502 |
| 2008/0127468 A1 * | 6/2008 | Huang | 29/25.03 |
| 2009/0046413 A1 * | 2/2009 | Huang | 361/517 |
| 2009/0109600 A1 * | 4/2009 | Reddy et al. | 361/502 |
| 2010/0030167 A1 * | 2/2010 | Thirstrup et al. | 604/318 |
| 2011/0038101 A1 * | 2/2011 | Caumont et al. | 361/502 |
| 2011/0141630 A1 * | 6/2011 | Pelc et al. | 361/15 |

* cited by examiner

*Primary Examiner* — Ronald W Leja
(74) *Attorney, Agent, or Firm* — Park, Vaughan, Fleming & Dowler LLP

(57) ABSTRACT

Some embodiments of the present invention provide a system that facilitates the operation of a supercapacitor. During operation, the system measures an electrical parameter of the supercapacitor using a set of conductor rings surrounding a capacitor seal of the supercapacitor. Next, the system determines the presence of a leak in the supercapacitor based on the electrical parameter. Finally, the system manages the operation of the supercapacitor based on the presence of the leak.

20 Claims, 3 Drawing Sheets

SUPERCAPACITOR LEAK DETECTION AND MANAGEMENT

BACKGROUND

1. Field

The present embodiments relate to techniques for monitoring supercapacitors. More specifically, the present embodiments relate to a method and system for detecting and managing leaks in supercapacitors.

2. Related Art

Supercapacitors typically provide higher energy density than normal capacitors and a greater number of charge-discharge cycles than rechargeable batteries. For example, a supercapacitor may have a capacitance of several farads and may last through millions of charge-discharge cycles, compared with tens of millifarads for a comparably sized electrolytic capacitor and a few hundred charge-discharge cycles for a rechargeable battery. As a result, supercapacitors may be used in applications that bridge the gap between capacitors and batteries. For example, supercapacitors may be used in automotive systems as replacements for batteries in hybrid or electric cars. Along the same lines, a computer system may include supercapacitors to power the transfer of data from volatile memory to nonvolatile memory when the computer system is disconnected from a power source.

However, supercapacitors may be associated with a higher risk of fire than common capacitors. In particular, the increased energy density of a supercapacitor is often provided by a flammable electrolyte within the supercapacitor. If the electrolyte leaks from the supercapacitor, the electrolyte may ignite and cause a fire that damages components near the supercapacitor and/or the system containing the capacitor. For example, a supercapacitor may leak electrolyte onto a printed circuit board (PCB) in a computer system and create a short circuit that causes a fire in the computer system and in nearby computer systems.

Hence, what is needed is a mechanism for reducing the flammability risk associated with supercapacitors.

SUMMARY

Some embodiments of the present invention provide a system that facilitates the operation of a supercapacitor. During operation, the system measures an electrical parameter of the supercapacitor using a set of conductor rings surrounding a capacitor seal of the supercapacitor. Next, the system determines the presence of a leak in the supercapacitor based on the electrical parameter. Finally, the system manages the operation of the supercapacitor based on the presence of the leak.

In some embodiments, the supercapacitor is used within a computer system.

In some embodiments, determining the presence of the leak in the supercapacitor involves:
(i) transmitting the electrical parameter to a leak-detection circuit coupled to the conductor rings;
(ii) providing the electrical parameter to a system controller in the computer system; and
(iii) analyzing the electrical parameter using the system controller.

In some embodiments, the electrical parameter is provided to the system controller using a system bus on the computer system.

In some embodiments, managing the operation of the supercapacitor based on the presence of the leak involves at least one of notifying a technician of the leak using the system controller and shutting down the computer system using the system controller.

In some embodiments, measuring the electrical parameter of the supercapacitor using the conductor rings involves measuring a first instance of the electrical parameter between an outer ring and a middle ring of the conductor rings and measuring a second instance of the electrical parameter between the middle ring and an inner ring of the conductor rings.

In some embodiments, the capacitor seal is larger than an outside diameter of the inner ring and smaller than an inside diameter of the outer ring.

In some embodiments, the first instance and the second instance of the electrical parameter are used to determine a direction of the leak from the supercapacitor.

In some embodiments, the electrical parameter corresponds to at least one of conductivity, capacitance, and resistance.

In some embodiments, the presence of the leak is associated with a change in the electrical parameter.

BRIEF DESCRIPTION OF THE FIGURES

In the figures, like reference numerals refer to the same figure elements.

DETAILED DESCRIPTION

Figure 1:
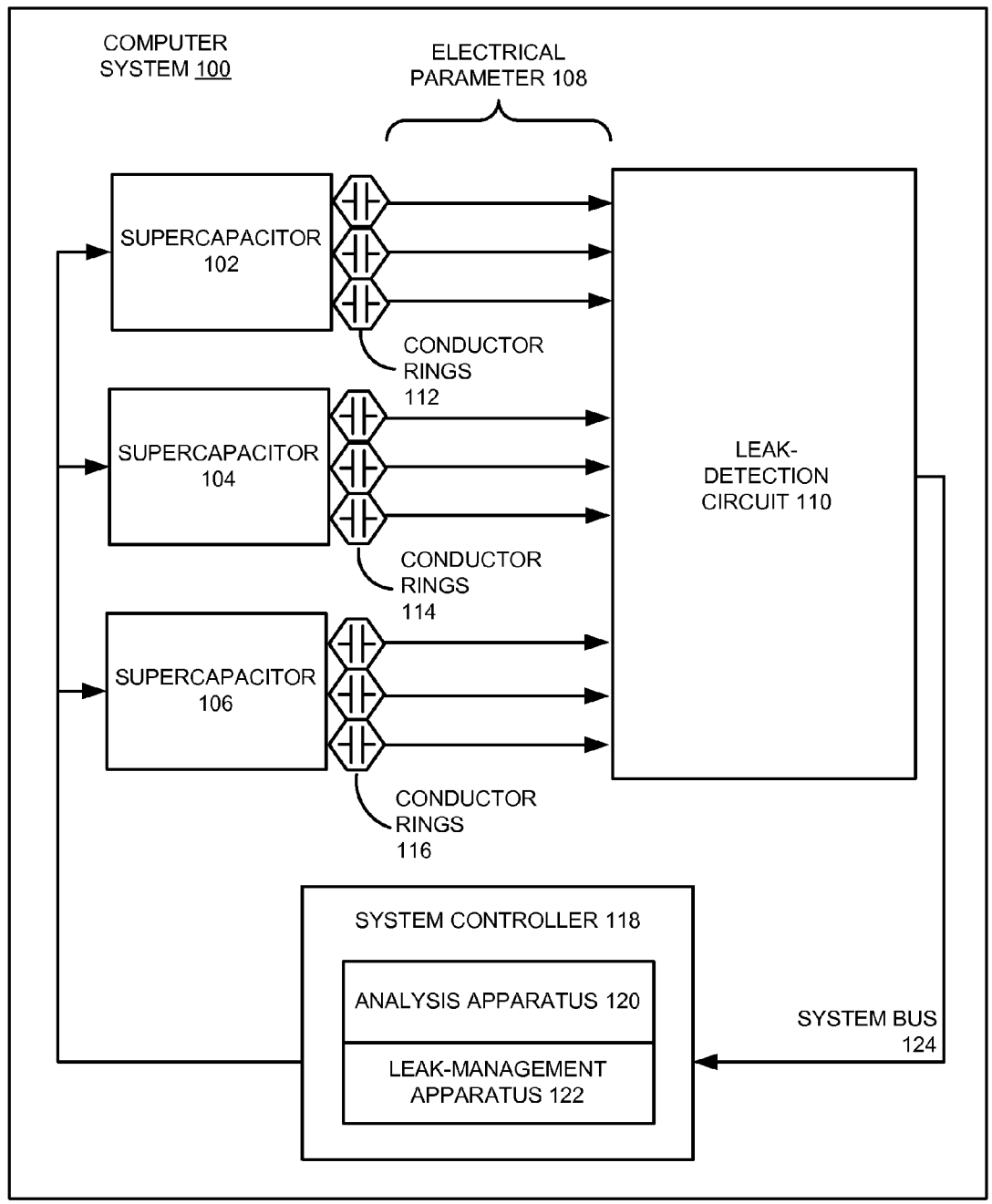
FIG. 1 shows a computer system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating the operation of a supercapacitor. The supercapacitor may be used to provide power to components in a computer system (e.g., personal computer, server, workstation, etc.), portable electronic device, automotive system, and/or other system with electronic components. For example, the supercapacitor may be used in regenerative braking of a vehicle, or as a power source for a Real Time Clock (RTC) chip in an electronic device.

More specifically, embodiments provide a method and system for detecting and managing leaks in the supercapacitor. An electrical parameter corresponding to conductivity and/or capacitance may be measured from the supercapacitor using a set of conductor rings surrounding the capacitor seal of the supercapacitor. The presence of a leak in the supercapacitor may then be determined using the electrical parameter. In particular, a change in the electrical parameter may indicate a leak. The leak may then be managed by notifying a technician of the leak and/or by shutting down the system containing the leak. For example, a system controller in a computer system may manage a supercapacitor leak in the computer system by shutting down the computer system.

FIG. 1 shows a computer system 100 in accordance with an embodiment. As shown in FIG. 1, computer system 100 includes a number of supercapacitors 102-106, three sets of conductor rings 112-116, a leak-detection circuit 110, a system controller 118, and a system bus 124. Each of these components is discussed in further detail below.

Supercapacitors 102-106 may provide energy to various components in computer system 100. For example, supercapacitors 102-106 may provide power to a Real Time Clock (RTC) chip, nonvolatile memory, and/or one or more light-emitting diodes (LEDs) in computer system 100. In addition, supercapacitors 102-106 may be used to facilitate the operation and/or maintenance of computer system 100. For example, supercapacitors 102-106 may power the transfer of data from volatile memory to nonvolatile memory in computer system 100 if computer system 100 is disconnected from a power source. Along the same lines, supercapacitors 102-106 may illuminate LEDs next to failed components in computer system 100 during servicing of computer system 100. In other words, supercapacitors 102-106 may be used in place of batteries and/or normal capacitors in computer system 100.

Those skilled in the art will appreciate that supercapacitors 102-106 may be associated with a higher flammability risk than normal capacitors. In particular, each supercapacitor 102-106 may contain a flammable electrolyte that increases the energy density of the supercapacitor. If the electrolyte leaks from the supercapacitor, the electrolyte may slowly create a short circuit that starts a fire in computer system 100. Alternatively, elevated temperatures inside computer system 100 may cause the electrolyte to leak from the supercapacitor and ignite instantaneously.

Fires that result from leaks in supercapacitors 102-106 may damage other components within computer system 100 and/or spread outside computer system 100. For example, a fire caused by a leak in supercapacitor 102 may render computer system 100 inoperable and spread to other computer systems in the same data center as computer system 100. Furthermore, haloalkane may be released within the data center to suppress the fire. As a result, fires caused by leaks in supercapacitors 102-106 may be costly with respect to both equipment damage caused by the fires and fire-extinguishing mechanisms used to put out the fires.

In one or more embodiments, computer system 100 includes functionality to detect and manage leaks in supercapacitors 102-106 before the leaks result in fires. As shown in FIG. 1, each supercapacitor 102-106 is monitored using a set of conductor rings 112-116 coupled to leak-detection circuit 110. Leak-detection circuit 110 may use conductor rings 112-116 to measure an electrical parameter 108 from supercapacitors 102-106. Each set of conductor rings 112-116 may surround the corresponding supercapacitor 102-106 and enable measurements of electrical parameter 108 as a capacitance and/or conductivity of the supercapacitor. Conductor rings 112-116 are discussed in further detail below with respect to FIG. 2.

After measuring electrical parameter 108 using conductor rings 112-116, leak-detection circuit 110 may transmit the measurements to system controller 118 using system bus 124 (e.g., an Inter-Integrated Circuit ($I^2C$) system bus). System controller 118 may be associated with and/or implemented using a service processor associated with computer system 100. An analysis apparatus 120 within system controller 118 may analyze the measurements of electrical parameter 108 from leak-detection circuit 110 to determine the presence of leaks in each supercapacitor 102-106. Alternatively, analysis apparatus 120 may be provided by leak-detection circuit 110, which may transmit alerts to system controller 118 when leaks are detected in one or more supercapacitors 102-106 based on measurements of electrical parameter 108 obtained using conductor rings 112-116.

As described above, electrical parameter 108 may correspond to conductivity and/or capacitance. As a result, an change in a measurement of electrical parameter 108 may indicate a leak in the supercapacitor (e.g., supercapacitors 102-106) from which the measurement is obtained. For example, conductor rings 114 may be used to measure electrical parameter 108 as a capacitance associated with supercapacitor 104. Because the dielectric between conductor rings 114 includes air and/or printed circuit board (PCB) substrate, the capacitance of supercapacitor 104 under normal conditions may be measured as a relatively low value. However, if electrolyte with a high dielectric constant leaks from supercapacitor 104 and spreads between two or more conductor rings 112, the measured capacitance may increase sharply.

In one or more embodiments, analysis apparatus 120 includes functionality to detect leaks in different types of supercapacitors based on measurements of electrical parameter 108 from each type of supercapacitor. For example, analysis apparatus 120 may include a threshold value for electrical parameter 108 for each type of supercapacitor in computer system 100. If a measurement of electrical parameter 108 for a supercapacitor exceeds the threshold value for that type of supercapacitor, analysis apparatus 120 may determine that electrolyte has leaked from the supercapacitor.

In one or more embodiments, leaks in supercapacitors 102-106 detected by analysis apparatus 120 may be managed by a leak-management apparatus 122 in system controller 118. For example, analysis apparatus 120 may observe a sharp change in electrical parameter 108 measured by conductor rings 112. In response to the change, leak-management apparatus 122 may notify a technician of a leak in supercapacitor 102 and/or shut down computer system 100 to prevent the leak from starting a fire in computer system 100.

Those skilled in the art will appreciate that functionality associated with detecting and managing leaks in supercapacitors 102-106 may be implemented in a variety of ways. As mentioned previously, analysis apparatus 120 may be provided by leak-detection circuit 110 and/or system controller 118. Similarly, leak-detection circuit 110 may reside on the same PCB as supercapacitors 102-106, or leak-detection circuit 110 may be placed on a separate plug-in board and/or a Peripheral Component Interconnect (PCI) card in computer system 100. As a result, leak-detection circuit 110 may be coupled to conductor rings 112-116 using one or more vias, traces, and/or buses (e.g., system bus 124) within computer system 100. Moreover, multiple leak-detection circuits may be used to monitor supercapacitors in computer system 100. For example, different leak-detection circuits may be used to monitor supercapacitors in different parts of computer system 100.

Those skilled in the art will also appreciate that leaks in supercapacitors outside computer system 100 may also be detected using one or more components in FIG. 1. For example, leak-detection circuit 110 and conductor rings 112-116 may be used to detect leaks in supercapacitors within automotive systems, portable electronic devices, avionics systems, and/or other systems with electronic components.

Figure 2:
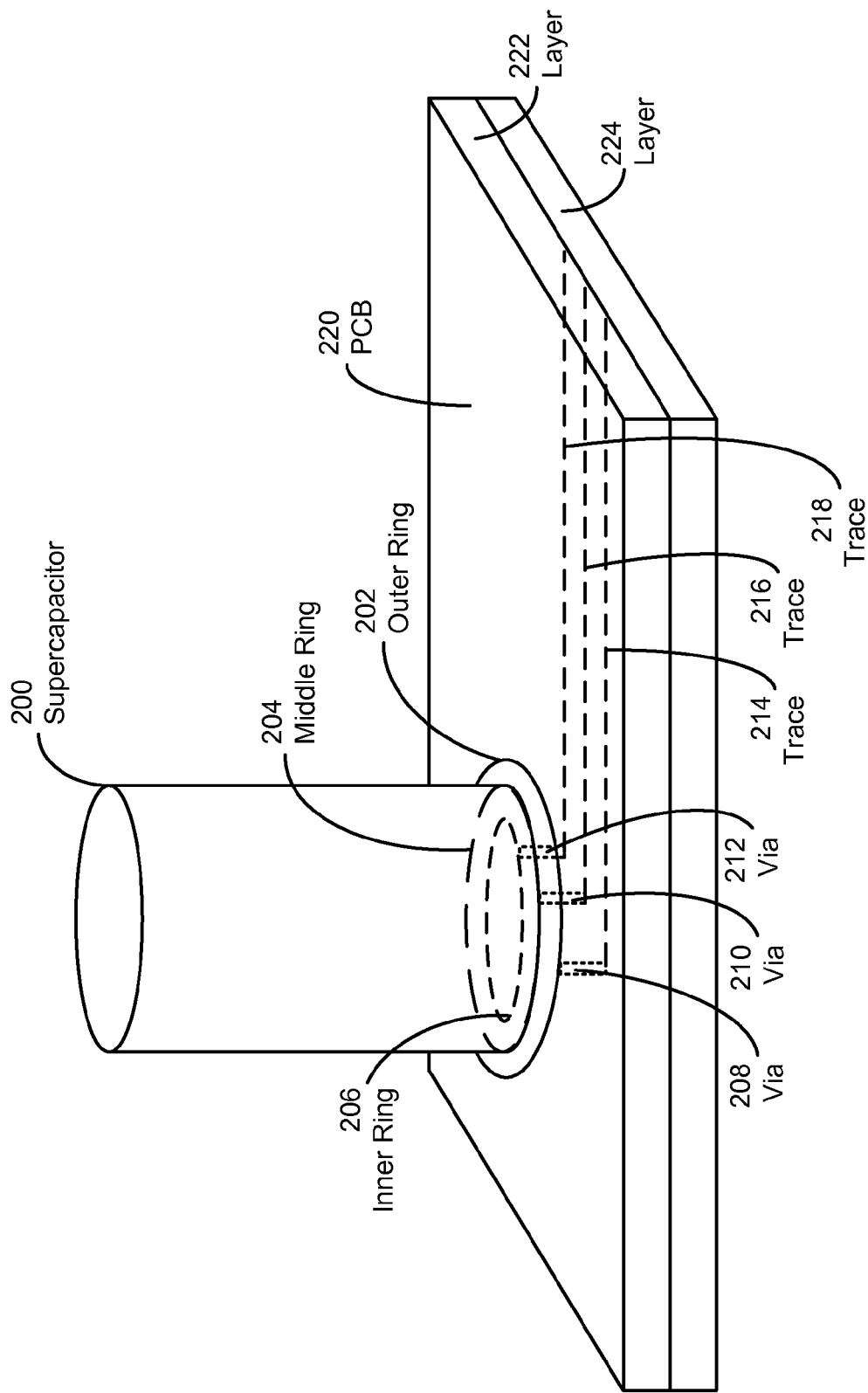
FIG. 2 shows a system for monitoring a supercapacitor in accordance with an embodiment.

FIG. 2 shows a system for monitoring a supercapacitor 200 in accordance with an embodiment. As mentioned previously, supercapacitor 200 may be used to supply power within a computer system, automotive system, portable electronic device, and/or other system with electronic components. Supercapacitor 200 is mounted on a PCB 220 containing at least two layers 222-224. A capacitor seal of supercapacitor 200 may contact PCB 220 along the perimeter of the bottom surface of supercapacitor 200. As a result, electrolyte may leak from supercapacitor 200 through the capacitor seal directly onto PCB 220.

A set of conductor rings surrounding the capacitor seal may be used to detect leaks in supercapacitor 200. The conductor rings may correspond to exposed traces on PCB 220 and include an outer ring 202, a middle ring 204, and an inner ring 206. As shown in FIG. 2, middle ring 204 is placed directly underneath the capacitor seal, while outer ring 202 is larger than the capacitor seal and inner ring 206 is smaller than the capacitor seal.

To assess the presence of leaks in supercapacitor 200, an electrical parameter corresponding to capacitance and/or conductivity may be measured using outer ring 202, middle ring 204, and inner ring 206, with middle ring 204 as the electrical ground. A first instance of the electrical parameter may be measured between outer ring 202 and middle ring 204, and a second instance of the electrical parameter may be measured between middle ring 204 and inner ring 202.

The first and second instances of the electrical parameter may be used to detect the direction of a leak in supercapacitor 200. If the leak moves outward from the capacitor seal (e.g., away from supercapacitor 200 onto PCB 220), the first instance of the electrical parameter may change while the second instance may remain the same. On the other hand, if the leak moves inward (e.g., underneath supercapacitor 200 onto PCB 220), the second instance of the electrical parameter may change while the first instance may remain the same. Consequently, outer ring 202, middle ring 204, and/or inner ring 206 may be used to detect leaks in supercapacitor 200 regardless of the orientation of PCB 220 (e.g., vertical, horizontal, etc.). For example, an outward leak from the capacitor seal may be detected as an increase in the conductivity between outer ring 202 and middle ring 204, or conversely as a decrease in the resistance between outer ring 202 and middle ring 204.

Outer ring 202, middle ring 204, and inner ring 206 are connected to a set of traces 214-218 using a set of vias 208-212 in PCB 220. Vias 208-212 and traces 214-218 may allow signals to be transmitted from outer ring 202, middle ring 204, and inner ring 206 to another component in PCB 220 and/or a component coupled to PCB 220, such as a leak-detection circuit (e.g., leak-detection circuit 110 of FIG. 1). In particular, vias 208-212 may connect the exposed traces of outer ring 202, middle ring 204, and inner ring 206 to traces 214-218 on the surface of layer 224 of PCB 220. Alternatively, traces 214-218 may be placed on other layers of PCB 220 and/or on different layers of PCB 220. Traces 214-218 may also connect to input pins on the component and/or to a bus that connects to the component. The component may thus measure the electrical parameter using differences in signals transmitted from outer ring 202, middle ring 204, and inner ring 206.

Figure 3:
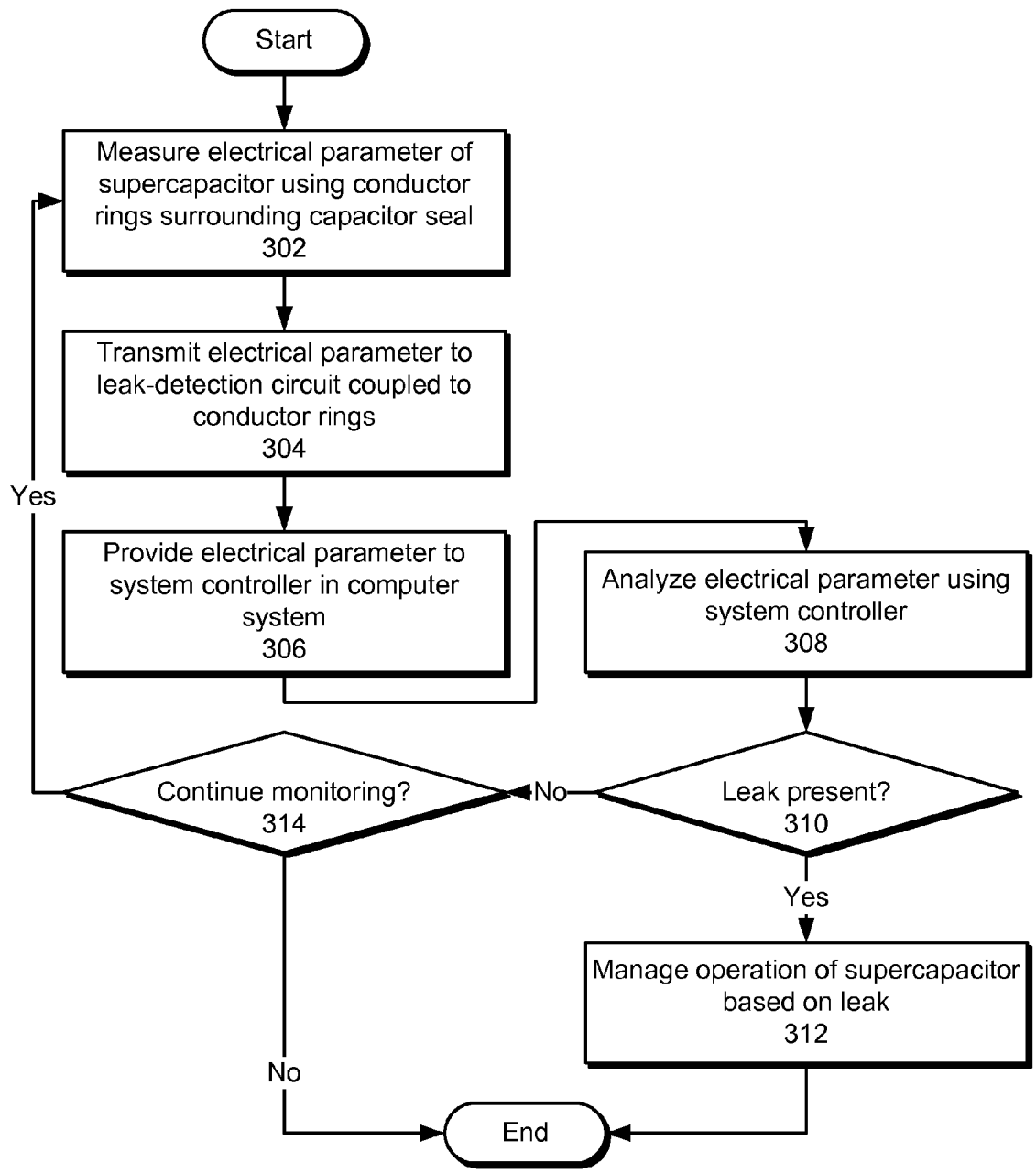
FIG. 3 shows a flowchart illustrating the process of facilitating the operation of a supercapacitor in accordance with an embodiment.

FIG. 3 shows a flowchart illustrating the process of facilitating the operation of a supercapacitor in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, an electrical parameter of the supercapacitor is measured using a set of conductor rings surrounding a capacitor seal (operation 302) of the supercapacitor. The electrical parameter may be measured as conductivity, capacitance, and/or resistance. The conductor rings may include an outer ring, middle ring, and inner ring disposed around the capacitor seal such that the capacitor seal is larger than an outside diameter of the inner ring and smaller than an inside diameter of the outer ring.

Next, the electrical parameter is transmitted to a leak-detection circuit coupled to the conductor rings (operation 304). The leak-detection circuit may obtain the electrical parameter as a difference in signals transmitted by pairs of the conductor rings. For example, the leak-detection circuit may measure a first instance of the electrical parameter between the outer ring and the middle ring and a second instance of the electrical parameter between the middle ring and the inner ring.

The electrical parameter is then provided to a system controller in a computer system (operation 306) containing the supercapacitor. For example, the electrical parameter may be transmitted from the leak-detection circuit to the system controller using a system bus in the computer system. Alternatively, the electrical parameter may be provided to a different controlling mechanism if the supercapacitor is used within an automotive system, a portable electronic device, an avionics system, and/or other system containing electrical components.

The system controller and/or controlling mechanism may analyze the electrical parameter (operation 308) to determine the presence of a leak (operation 310) in the supercapacitor. In particular, a leak may be detected as a change in the electrical parameter measured between a pair of conductor rings. For example, if a change is observed in the electrical parameter measured between the outer ring and the middle ring, a leak that moves outward from the capacitor seal may be detected. On the other hand, if a change is found in the electrical parameter measured between the middle ring and the inner ring, a leak that moves inward from the capacitor seal may be detected. As a result, the outer ring, middle ring, and inner ring may be used to determine the direction of the leak from the supercapacitor and may allow leaks to be detected regardless of the orientation of the supercapacitor.

If a leak is present, the operation of the supercapacitor is managed based on the leak (operation 312). For example, the system controller and/or controlling mechanism may notify a technician of the leak and/or shut down the system (e.g., computer system) containing the supercapacitor. If no leak is found, the supercapacitor may continue to be monitored (operation 314). If monitoring is to continue, the electrical parameter is measured from the supercapacitor using the conductor rings (operation 302), and the presence of a leak in the supercapacitor is determined based on the electrical parameter (operations 304-310). If a leak is found, the operation of the supercapacitor is managed based on the leak (operation 312). The supercapacitor may continue to be monitored (operation 314) until the supercapacitor is no longer used. Also, if it can be determined how much material leaks from the supercapacitor and if the amount of leakage exceeds a predetermined threshold value, the system controller can cause the computer system to shut down.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating the operation of a supercapacitor, comprising:
    measuring an electrical parameter of the supercapacitor using a set of conductor rings surrounding a capacitor seal of the supercapacitor;
    determining the presence of a leak in the supercapacitor based on the electrical parameter; and
    managing the operation of the supercapacitor based on the presence of the leak.

2. The method of claim 1, wherein the supercapacitor is used within a computer system.

3. The method of claim 2, wherein determining the presence of the leak in the supercapacitor involves:
    transmitting the electrical parameter to a leak-detection circuit coupled to the conductor rings;
    providing the electrical parameter to a system controller in the computer system; and
    analyzing the electrical parameter using the system controller.

4. The method of claim 3, wherein the electrical parameter is provided to the system controller using a system bus on the computer system.

5. The method of claim 3, wherein managing the operation of the supercapacitor based on the presence of the leak involves at least one of:
    notifying a technician of the leak using the system controller; and
    shutting down the computer system using the system controller.

6. The method of claim 1, wherein measuring the electrical parameter of the supercapacitor using the conductor rings involves:
    measuring a first instance of the electrical parameter between an outer ring and a middle ring of the conductor rings; and
    measuring a second instance of the electrical parameter between the middle ring and an inner ring of the conductor rings.

7. The method of claim 6, wherein the capacitor seal is larger than an outside diameter of the inner ring and smaller than an inside diameter of the outer ring.

8. The method of claim 7, wherein the first instance and the second instance of the electrical parameter are used to determine a direction of the leak from the supercapacitor.

9. The method of claim 1, wherein the electrical parameter corresponds to at least one of conductivity, capacitance, and resistance.

10. The method of claim 1, wherein the presence of the leak is associated with an change in the electrical parameter.

11. A system for facilitating the operation of a supercapacitor, comprising:
    a set of conductor rings surrounding a capacitor seal of the supercapacitor;
    a leak-detection circuit configured to measure an electrical parameter of the supercapacitor using the conductor rings; and
    a system controller configured to:
        determine the presence of a leak in the supercapacitor based on the electrical parameter; and
        manage the operation of the supercapacitor based on the presence of the leak.

12. The system of claim 11, wherein the supercapacitor is used within a computer system.

13. The system of claim 12, wherein the electrical parameter is transmitted to the system controller from the leak-detection circuit using a system bus on the computer system.

14. The system of claim 12, wherein managing the operation of the supercapacitor based on the presence of the leak involves at least one of:
    notifying a technician of the leak using the system controller; and
    shutting down the computer system using the system controller.

15. The system of claim 11, wherein the leak-detection circuit is coupled to the conductor rings using at least one of a via, a trace, and a bus.

16. The system of claim 11, wherein measuring the electrical parameter of the supercapacitor involves:
    measuring a first instance of the electrical parameter between an outer ring and a middle ring of the conductor rings; and
    measuring a second instance of the electrical parameter between the middle ring and an inner ring of the conductor rings.

17. The system of claim 16, wherein the capacitor seal is larger than an outside diameter of the inner ring and smaller than an inside diameter of the outer ring.

18. The system of claim 17, wherein the first instance and the second instance of the electrical parameter are used to determine a direction of the leak from the supercapacitor.

19. The system of claim 11, wherein the electrical parameter corresponds to at least one of conductivity, capacitance, and resistance.

20. The system of claim 11, wherein the presence of the leak is associated with an change in the electrical parameter.

* * * * *